May 20, 1952   J. D. CASSIDY ET AL   2,597,449
SLIDE PROJECTOR WITH ROTATABLE SLIDE MOUNT
Filed Nov. 9, 1950   2 SHEETS—SHEET 1

INVENTORS
John D Cassidy
BY Frank David Marks
David J Morning
their ATTORNEY

May 20, 1952 J. D. CASSIDY ET AL 2,597,449
SLIDE PROJECTOR WITH ROTATABLE SLIDE MOUNT
Filed Nov. 9, 1950 2 SHEETS—SHEET 2

INVENTORS
John D. Cassidy
BY Joseph David Marks
David J Marks
their ATTORNEY

Patented May 20, 1952

2,597,449

UNITED STATES PATENT OFFICE 2,597,449

SLIDE PROJECTOR WITH ROTATABLE SLIDE MOUNT

John D. Cassidy, Riverside, Conn., and Joseph David Marks, West Orange, N. J., assignors to Universal Camera Corporation, New York, N. Y., a corporation of Delaware Application November 9, 1950, Serial No. 194,868

6 Claims. (Cl. 88—28)

This invention relates to slide projectors and, more particularly, to a novel and simple slide mount and focusing arrangement.

The invention projector is designed for easy and inexpensive assembly, and for disassembly of components for inspection, replacement and repair of parts. Thus, the projector includes a relatively solid and stable base having an adjustable rear leg for vertical alignment of the optical axis of the projector with a viewing screen. This base supports a light-weight ventilated housing for the light source and light condensing lens system.

The top of the housing is readily removable therefrom for access to the light source and condenser, and the slide mount and focusing arrangement is supported in projecting relation on the front wall. The front wall has an aperture aligned with the condenser axis and is formed with spring fingers extending toward and defining the aperture. These fingers are formed with buttons, which cooperate with recesses in a flange on a cup-shaped member of the focusing arrangement and slide mount, so that the cup-shaped member may be angularly displaced about its axis and releasably held in adjusted position.

The flanged, cup-shaped member is held against the housing wall by an apertured plate slipped over the same and in engagement with the flange and secured to the wall. The wall has secured thereto a tubular member having means receiving a slide holder. This tubular member telescopically receives a tubular lens mount and, between the tubular member and the lens mount, a helical spring is disposed and anchored at one end to the tubular member, the other end bearing against a displaceable plate forming part of the slide holder. The displaceable slide plate of the slide holder which is biased toward the housing by the spring, is provided with means serving to develop a detent action on the slide passing through the slide holder. The spring engages radial abutments projecting from the lens mount, thus providing for adjustment of the lens system by "screwing" the mount along the spring, which there functions as a thread.

For an understanding of the invention principles, reference is made to the following detailed description of a typical embodiment thereof as illustrated in the accompanying drawings.

Figure 1:
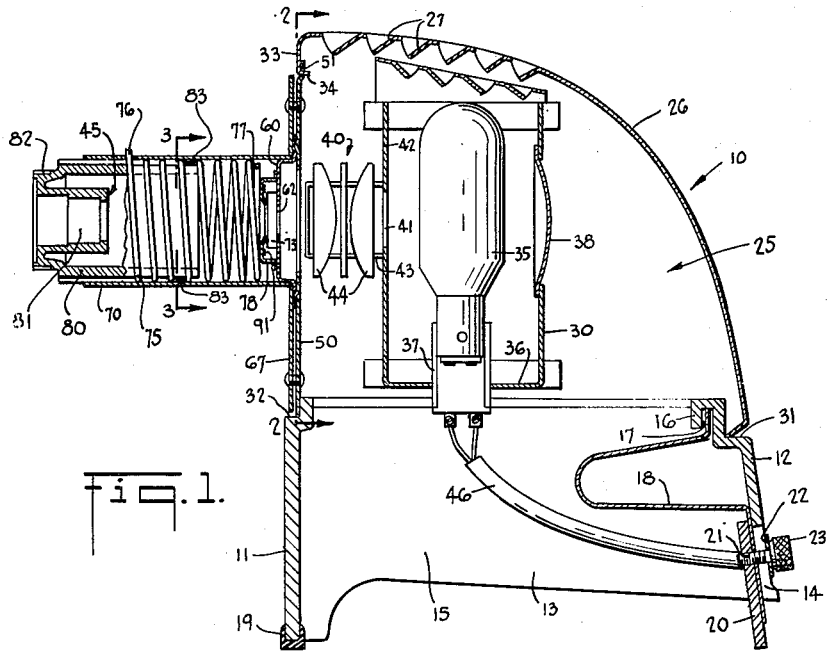
Fig. 1 is a vertical sectional view through a projector embodying the invention.
Figure 2:
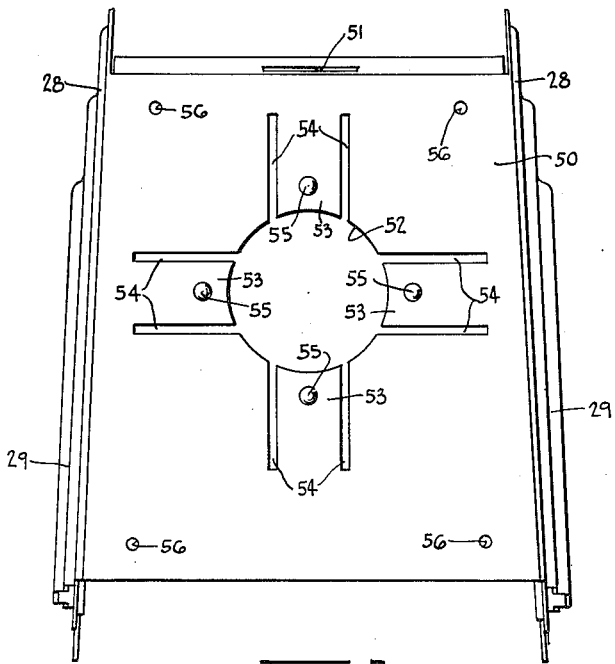
Fig. 2 is a view on the line 2—2 of Fig. 1, the slide mount and focusing arrangement being removed.

Referring to the drawings, the projector 10 includes a base 15 having front wall 11, rear wall 12, and side walls 13, the top and bottom of the base being open. The base 15 may be a suitable metal casting having sufficient mass to provide solidity and stability for the projector. Forward wall 11 has a rubber channel 19 on its lower edge.

The base includes means for adjusting the projection axis in a vertical plane. Thus, rear wall 12 has a vertical slot 14 in its lower edge, and a flange 16 forwardly of the rear wall cooperates therewith to form a seating groove 17 for the upper end of a flat spring 18. The lower end of spring 18 is secured to a flat leg 20 arranged for vertical adjustment along wall 12. A thumb screw 21 extends through slot 14 and is threaded into leg 20, a strip 22 underlying the head 23 of screw 21 and extending beyond both sides of slot 14. By loosening thumb screw 21, leg 20 may be adjusted along wall 12 to change the horizontal angle of the projection axis to center the projection vertically on a screen. Spring 18 tends to bias leg 20 downward and thus to tilt projector 10 counterclockwise, as viewed in Fig. 1. In the adjusted position of the projector, screw 21 is retightened.

Housing 25 is preferably of sheet metal, and includes a curving rear and top wall 26, having vent louvers 27, and side walls 28 which may be ribbed, as at 29, for rigidity. The housing is mounted on base 15 by seating of its lower edge on shoulders 31, 32 formed around the upper periphery of base 15. The forward edge of wall 26 is flanged, as at 33, and flange 33 has an inturned lip 34 fitting a slot 51 in front wall 50 mounted on base 15.

Side walls 28 of the housing support a channel shaped lamp housing 30 having a base 36 supporting a socket 37 for lamp 35. A reflector 38 is mounted in housing 30 behind lamp 35 and in axial alignment with an aperture 41 in the forward wall 42 of the lamp housing. Wall 42 has secured thereto a bracket 43 supporting a conventional light condenser, generally indicated at 40, and comprising condensing lenses 44, 44. Condenser 40, aperture 41 and reflector 38 are coaxial with the focusing arrangement 45.

Socket 37 is connected to a cord 46 which leads to a suitable control switch (not shown) on base 15 and connectible by an appliance cord and plug to an outlet receptacle in the usual manner.

Wall 50 has a circular aperture 52 defined, in part, by the free edges of four spring fingers 53 arranged at 90° to each other and formed by pairs of parallel slots 54 cut in wall 50. Aperture 52 is coaxial with the projection axis. For a purpose to be described, each finger 53 has a button 55 pressed outwardly therefrom adjacent its free edge. Adjacent each of its four corners, wall 50 has apertures 56 to receive fastening elements such as screws, pins, clips, or the like.

The focusing arrangement and slide mount are supported on wall 50 by means of a flanged, cup-shaped member 60 having a base 61 with an aperture 62 coaxial with the projector axis. The rim 63 of member 60 has an out-turned annular flange 64 engaging wall 50 and overlying buttons 55. This flange has four holes 66 spaced circumferentially 90° from each other and each engageable with a button 55. Thereby, member 60 may be rotated to and releasably held in any one of four positions at 90° to each other. This feature provides for ready and easy selective positioning of a slide relative to the projection axis. Member 60 is held on wall 50 by a plate 67 overlying flange 64 and having a central aperture 68 receiving and slightly larger than member 60. Plate 67 has four holes 69 alignable with the holes 56 in wall 50 for receiving fastening means for holding the plate on wall 50.

Figure 4:
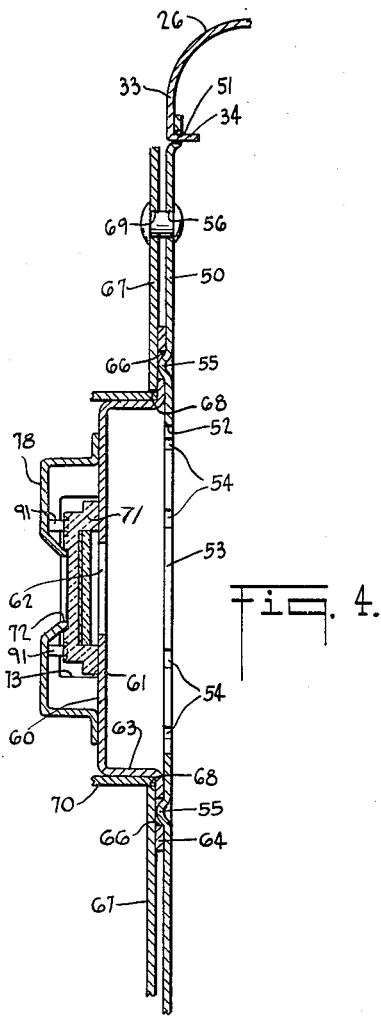
Fig. 4 is a sectional view on the line 4—4 of Fig. 5, illustrating the mounting of the cup-shaped base on the housing forward wall.
Figure 5:
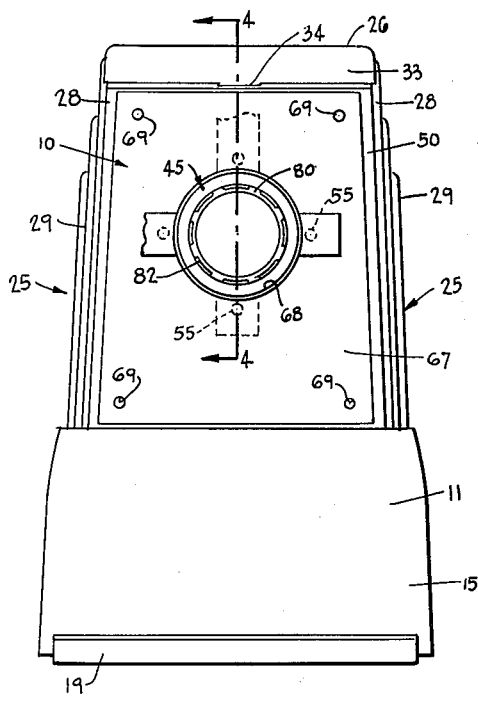
Fig. 5 is a front elevation view of the projector.

A substantially rectangular slide holder receives a slide element 71 which may be of the structure shown in our copending application Serial No. 194,866 entitled "Film Mounting," and this slide holder has an aperture 72 coaxial with the projection axis. The slide holder, which is defined by base 61 of cup-shaped member 60 and a separable channel-shaped plate 78 (see Fig. 4), is mounted within and diametrically aligned with a pair of opposed slots 73 in an elongated tubular member 70 telescoped over and secured to the rim 63 of member 60. Within tube 70 is a helical coil spring 75 having one end 76 anchored by projection through a hole in tube 70, and the other end 77, of circular configuration, pressing against the base of displaceable plate 78 which, as associated with base 61 of cup-shaped member 60, defines the slide holder. Plate 78 has formed therein spaced projections 91 to provide a detent means acting on the spaced depressions on the rear face of the slide aforesaid, so that registry of the respective frames of said slide with the aperture 72 may be maintained under the biasing action of spring 75 and plate 78 as the slide is moved through the slide holder.

Spring 75 embraces lens mount 80, which is generally cylindrical and formed with a smaller, tubular lens support 81 at its forward end. For ready manipulation to focus the projector, mount 80 is externally fluted as at 82. Support 81 may contain one or more lenses (not shown).

Figure 3:
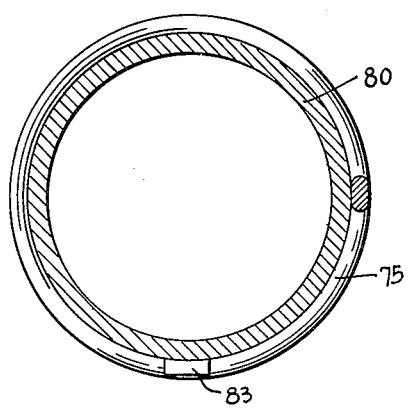
Fig. 3 is a diametric sectional view on the line 3—3 of Fig. 1.

In order to adjust the focus by rotation of mount 80, the rear portion of the latter has a pair of projections 83, 83 engaged with the convolutions of spring 75 (Figs. 1 and 3). When mount 80 is turned, projections 83 ride along the spring convolutions to move the mount axially of tube 70. The coil spring 75 in tube 70 cooperable with the projections 83 of mount 80 provide a simple, inexpensive, and easily assembled focusing adjustment controlled by the threaded contour of said spring, wherein the configuration is such that the helix of the spring slightly bends in projections 83, 83 to eliminate backlash.

While a specific embodiment of the invention has been shown and described in detail to illustrate the application of the invention principles, it should be understood that the invention may be otherwise embodied without departing from such principles.

What is claimed is:

1. A slide projector comprising, in combination, a base, a housing secured to said base, a light source and a light condenser mounted in said housing, a forward wall of said housing having an aperture aligned with said source and condenser, said wall being formed with spring fingers extending radially toward the wall aperture, a tubular slide mount having a radially projecting flange at one end engageable with the outer surface of said wall, said slide mount having a pair of diametrically aligned apertures for receiving a slide holder through which passes a slide, means securing said flange to said wall with the slide mount coaxial with the wall aperture, whereby said slide mount may be adjusted about its axis relative to said wall, and releasably interengageable means on said flange and said fingers operable to retain said mount in an adjusted position.

2. A slide projector comprising, in combination, a base, a housing secured to said base, a light source and a light condenser mounted in said housing, a forward wall of said housing having an aperture aligned with said source and condenser, a tubular slide mount having a radially projecting flange at one end engageable with the outer surface of said wall, said slide mount having a pair of diametrically aligned apertures for receiving a slide holder through which passes a slide, means securing said flange to said wall with the slide mount coaxial with the wall aperture, whereby said slide mount may be adjusted about its axis relative to said wall, a helical coil spring telescoped within said tubular slide mount and anchored at one end thereto, and at the other end biasing said slide holder toward the forward wall of the housing, and a tubular lens mount telescoped within said spring and having a radial projection engaged with the spring convolutions, whereby, relative rotation of said lens mount and slide mount will effect relative longitudinal movement therebetween.

3. A slide projector comprising, in combination, a base, a housing secured to said base, a light source and a light condenser mounted in said housing, a forward wall of said housing having an aperture aligned with said source and condenser, a tubular slide mount having a radially projecting flange at one end engageable with the outer surface of said wall, said slide mount having a pair of diametrically aligned apertures for receiving a slide holder through which passes a slide, means securing said plate to said wall with the slide mount coaxial with the wall aperture, whereby said slide mount may be adjusted about its axis relative to said wall, releasably interengageable means on said flange and said wall operable to retain said mount in an adjusted position, a helical coil spring telescoped within said tubular slide mount and anchored at one end thereto, and at the other end biasing said slide holder toward the forward wall of the housing, and a tubular lens mount telescoped within said spring and having a radial projection engaged with the spring convolutions, whereby, relative rotation of said lens mount and slide mount will effect relative longitudinal movement therebetween.

4. A slide projector comprising, in combination, a base, a housing secured to said base, a light source and a light condenser mounted in said housing, a forward wall of said housing having an aperture aligned with said source and condenser, said wall being formed with spring fingers extending radially toward the wall aperture, a tubular slide mount having a radially projecting flange at one end engageable with the outer surface of said wall, said slide mount having a pair of diametrically aligned apertures for receiving a slide holder through which passes a slide, means securing said flange to said wall with the slide mount coaxial with the wall aperture, whereby said slide mount may be adjusted about its axis relative to said wall, releasably interengageable means on said flange and said fingers operable to retain said mount in an adjusted position, a helical coil spring telescoped within said tubular slide mount and anchored at one end thereto, and at the other end biasing said slide holder toward the forward wall of the housing, and a tubular lens mount telescoped within said spring and having a radial projection engaged with the spring convolutions, whereby, relative rotation of said lens mount and slide mount will effect relative longitudinal movement therebetween.

5. A slide projector comprising, in combination, a base, a housing secured to said base, a light source and a light condenser mounted in said housing, a forward wall of said housing having an aperture aligned with said source and condenser, said wall being formed with spring fingers extending radially toward the wall aperture, a tubular slide mount having a radially projecting flange at one end engageable with the outer surface of said wall, said slide mount having a pair of diametrically aligned apertures for receiving a slide holder through which passes a slide, means securing said flange to said wall with the slide mount coaxial with the wall aperture, whereby said slide mount may be adjusted about its axis relative to said wall, releasably interengageable means on said flange and said fingers operable to retain said mount in an adjusted position, a helical coil spring telescoped within said tubular slide mount and anchored at one end thereto, and at the other end biasing said slide holder toward the forward wall of the housing, a tubular lens mount telescoped within said spring and having a radial projection engaged with the spring convolutions, whereby, relative rotation of said lens mount and slide mount will effect relative longitudinal movement thereof, and indexing means on said slide holder for providing a detenting action against the slide passing therethrough.

6. A slide projector comprising, in combination, a base, a housing secured to said base, a light source and a light condenser mounted in said housing, a flat forward wall for said housing, said wall having an aperture alignable with said source and condenser, said wall being formed with spring fingers extending radially toward the wall aperture, a tubular slide mount having a radially projecting flange at one end engageable with the outer surface of said wall, said slide mount having a pair of diametrically aligned apertures for receiving a slide holder through which passes a slide, means securing said flange to said wall with the slide mount coaxial with the wall aperture, whereby said slide mount may be adjusted about its axis relative to said wall, releasably interengageable means on said flange and said fingers operable to retain said mount in an adjusted position, a helical coil spring telescoped within said tubular slide mount and anchored at one end thereto, and at the other end biasing said slide holder toward the forward wall of the housing, and a tubular lens mount telescoped within said spring and having a radial projection engaged with the spring convolutions, whereby, relative rotation of said lens mount and slide mount will effect relative longitudinal movement therebetween.

JOHN D. CASSIDY.
JOSEPH DAVID MARKS.

REFERENCES CITED

The following references are of record in the file of this patent:

UNITED STATES PATENTS

| Number | Name | Date |
|---|---|---|
| 24,327 | Perry | June 7, 1859 |
| 1,364,278 | Hochstetter | Jan. 4, 1921 |
| 1,949,067 | Wheelock et al. | Feb. 27, 1934 |
| 2,172,256 | Nagel | Sept. 5, 1939 |
| 2,251,077 | Stanton | July 29, 1941 |
| 2,252,513 | Koehl | Aug. 12, 1941 |
| 2,271,530 | Wick | Feb. 3, 1942 |
| 2,276,735 | Miller | Mar. 17, 1942 |
| 2,309,301 | Burr | Jan. 26, 1943 |
| 2,468,565 | Marcus et al. | Apr. 26, 1949 |